UNITED STATES PATENT OFFICE.

OTTO SCHMIDT, OF LUDWIGSHAFEN-ON-THE-RHINE, GERMANY, ASSIGNOR, BY MESNE ASSIGNMENTS, TO THE CHEMICAL FOUNDATION, INC., A CORPORATION OF DELAWARE.

SOLUBLE CONDENSATION PRODUCT AND PROCESS OF MAKING IT.

1,336,759. Specification of Letters Patent. Patented Apr. 13, 1920.

No Drawing. Application filed December 4, 1913, Serial No. 804,744. Renewed September 3, 1919. Serial No. 321,464.

*To all whom it may concern:*

Be it known that I, OTTO SCHMIDT, citizen of the German Empire, residing at Ludwigshafen-on-the-Rhine, Germany, have invented new and useful Improvements in Soluble Condensation Products and Processes of Making Them, of which the following is a specification.

My invention relates to new soluble condensation products obtainable from naphthalene, formaldehyde and sulfuric acid and of great value in the arts, in several directions, especially they are capable of tanning skins and of producing with basic dyestuffs, very valuable color lakes. My new products are characterized by possessing the following properties. They are, in the form of the free acids, soluble in less than five parts by weight of water, and in the pure state are practically colorless. With a solution of ferric chlorid they do not give a coloration and they are capable of tanning skins and also of enabling otherwise insoluble portions of other tanning agents to be dissolved in water.

I can obtain my new compounds, for instance, by treating, in the presence or absence of suitable condensing agents, naphthalene sulfonic acids with formaldehyde while using such concentrations, temperatures and proportions of said materials and during such time, that on dilution with water the mass practically remains, or is, dissolved. By the interaction of the materials employed, insoluble by-products are sometimes formed and if such is the case in a remarkable degree, I remove the insoluble matter by pouring the reaction mass into water, filtering the liquid and, if desired, reconcentrating the filtrate, preferably after partial or complete neutralization. I can also obtain my new products by treating, with a sulfonating agent, the insoluble products obtainable by reacting with formaldehyde on naphthalene, such for instance as are described in the specification of Letters Patent No. 898,307.

For the purpose of this invention, I regard homologues of naphthalene as equivalent to naphthalene itself, and under the term formaldehyde I include also a body which gives rise to formaldehyde. The process of tanning with my new products is described and claimed in my application for patent Serial No. 804,745.

The following examples will serve to illustrate further the nature of my invention, but the invention is not confined to these examples. The parts are by weight.

*Example. 1.*

Heat together, at from 130° to 140° C., 10 parts of naphthalene and 12.5 parts of 98% sulfuric acid. When the sulfonation is complete giving a naphthalene-beta-sulfonic acid, cool to about 80° to 90° C., and then add, in small portions at a time, while stirring vigorously, 4 parts of 30% formaldehyde, maintaining the temperature both during and after the addition at from 60° to 100° C. After a time the mass gradually thickens and toward the end of the reaction stirring becomes difficult. It is then preferred to add enough water to enable the mass to be easily stirred and the stirring is continued until the odor of formaldehyde has disappeared. On cooling, the resulting product becomes solid and then consists of a resinous, slightly colored mass which is easily soluble in cold water. This resinous material, which is a sulfonic acid, is soluble in less than five parts by weight of cold water. When the solution is partly, or wholly neutralized, by adding an alkali, the mixture of acid and salt so produced, or the salts formed by complete neutralization, are still soluble in the same amount of cold water. The solution obtained has the property, either directly or after partial or complete neutralization, of enabling the difficultly soluble part of quebracho tanning material to be readily dissolved, and it is also itself capable of tanning hides.

A similar procedure can be adopted when employing pure naphthalene-sulfonic acids in the absence of suitable condensation agents.

*Example 2.*

Warm together, at 80° C., 50 parts of concentrated sulfuric acid and 50 parts of the condensation product obtainable from naphthalene and formaldehyde according to the specification of German Patent No. 207,743. When the sulfonation is complete, dissolve the reaction product in water and free it from excess of i. e. from free sulfuric acid by means of baryta or lime, whereupon a solution of the sulfonic acid is obtained. This solution can be employed either directly or can be partially or completely neutralized before use. The alkali salts as also the free sulfonic acid and mixtures of both are easily soluble in water.

*Example 3.*

Stir together, at 130° C., 250 parts of methyl-naphthalene and 250 parts of concentrated sulfuric acid. When the sulfonation is complete, allow to cool, add 100 parts of water and then, while stirring well at ordinary temperature, add 27 parts of tri-oxy-methylene. Continue stirring for a few hours, work up the product as described in the foregoing Example 2. The sulfonic acid obtained in this way is either amorphous or thick and syrupy, and its alkali salts are easily soluble in water.

Now what I claim is:

1. The new condensation products obtainable from naphthalene, sulfuric acid and formaldehyde, which products in the form of the free acids, are soluble in less than five parts by weight of water, practically colorless in the pure state and give no coloration with a solution of ferric chlorid, and are capable of tanning skins.

2. The new condensation product obtainable from naphthalene, sulfuric acid and formaldehyde, which product is a free sulfonic acid and practically free from sulfuric acid and is soluble in less than five parts by weight of water, practically colorless in the pure state, gives no coloration with a solution of ferric chlorid, and is capable of tanning skin.

3. The new condensation product obtainable from naphthalene, sulfuric acid and formaldehyde, which product after partial neutralization with an alkali is a mixture of the free sulfonic acid and of an alkali salt thereof and is soluble in less than five parts by weight of water, practically colorless in the pure state, gives no coloration with a solution of ferric chlorid, and is capable of tanning skin.

4. The process of producing water soluble condensation products capable of tanning skins, which consists in treating naphthalene with about an equal quantity of sulfuric acid at a temperature of, at most, about 140 degrees C., and treating the resultant product with formaldehyde at a lower temperature.

5. The process of producing water soluble condensation products capable of tanning skins, which consists in treating naphthalene with about an equal quantity of sulfuric acid at a temperature of, at most, about 140 degrees C., and treating the resultant product with formaldehyde at a lower temperature, then diluting it with water, and treating the solution with a neutralizing agent.

In testimony whereof I have hereunto set my hand in the presence of two subscribing witnesses.

OTTO SCHMIDT.

Witnesses:
J. ALEC. LLOYD,
S. S. BERGER.